United States Patent [19]

Stevens

[11] Patent Number: 4,630,741
[45] Date of Patent: Dec. 23, 1986

[54] EXTENDIBLE BOOM INCLUDING A RACK AND PINION MECHANISM

[76] Inventor: Alec M. Stevens, P.O. Box 329, Atherton, Queensland 4883, Australia

[21] Appl. No.: 678,554
[22] PCT Filed: Mar. 20, 1984
[86] PCT No.: PCT/AU84/00047
 § 371 Date: Nov. 20, 1984
 § 102(e) Date: Nov. 20, 1984
[87] PCT Pub. No.: WO84/03603
 PCT Pub. Date: Sep. 27, 1984

[30] Foreign Application Priority Data

Mar. 22, 1983 [AU] Australia .............................. PF8551

[51] Int. Cl.⁴ ............................................. B66C 23/56
[52] U.S. Cl. ................................. 212/203; 212/264; 212/267; 56/11.9
[58] Field of Search ................ 212/159, 172, 205–221, 212/224, 230, 264, 267, 269, 203; 56/11.9

[56] References Cited

U.S. PATENT DOCUMENTS

| | | | |
|---|---|---|---|
| 1,611,326 | 12/1926 | Abbe | 212/267 |
| 2,823,947 | 2/1958 | Delzer | 212/230 |
| 2,872,050 | 2/1959 | Norwood | 212/224 |
| 2,896,750 | 7/1959 | Eitel | 212/267 |
| 2,993,605 | 7/1961 | Smith | 212/230 |
| 3,462,925 | 8/1969 | Lanier | 56/11.9 |
| 4,266,908 | 5/1981 | Leiker | 212/230 |

Primary Examiner—Trygve M. Blix
Assistant Examiner—Stephen P. Avila

[57] ABSTRACT

An extendible boom utilizing a rack and pinion mechanism to enable reciprocating movement of a work head such as a spray for agricultural application beneath orchard trees, the boom comprising a hollow section having a substantially rectangular cross-section containing a slot along the lower wall, running on internally disposed supporting rollers, having a rack extended therealong, mated with a driven pinion wheel to enable boom movement.

9 Claims, 7 Drawing Figures

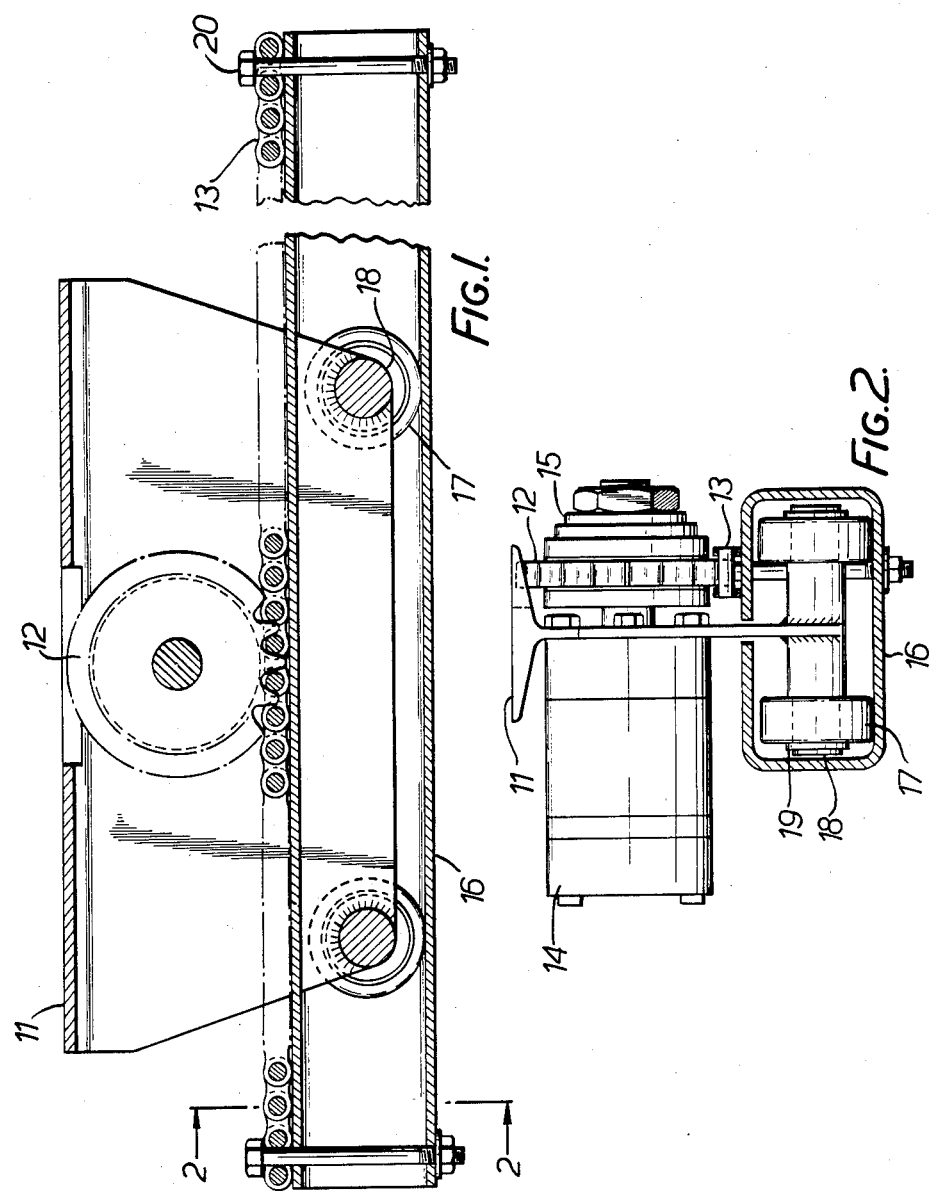

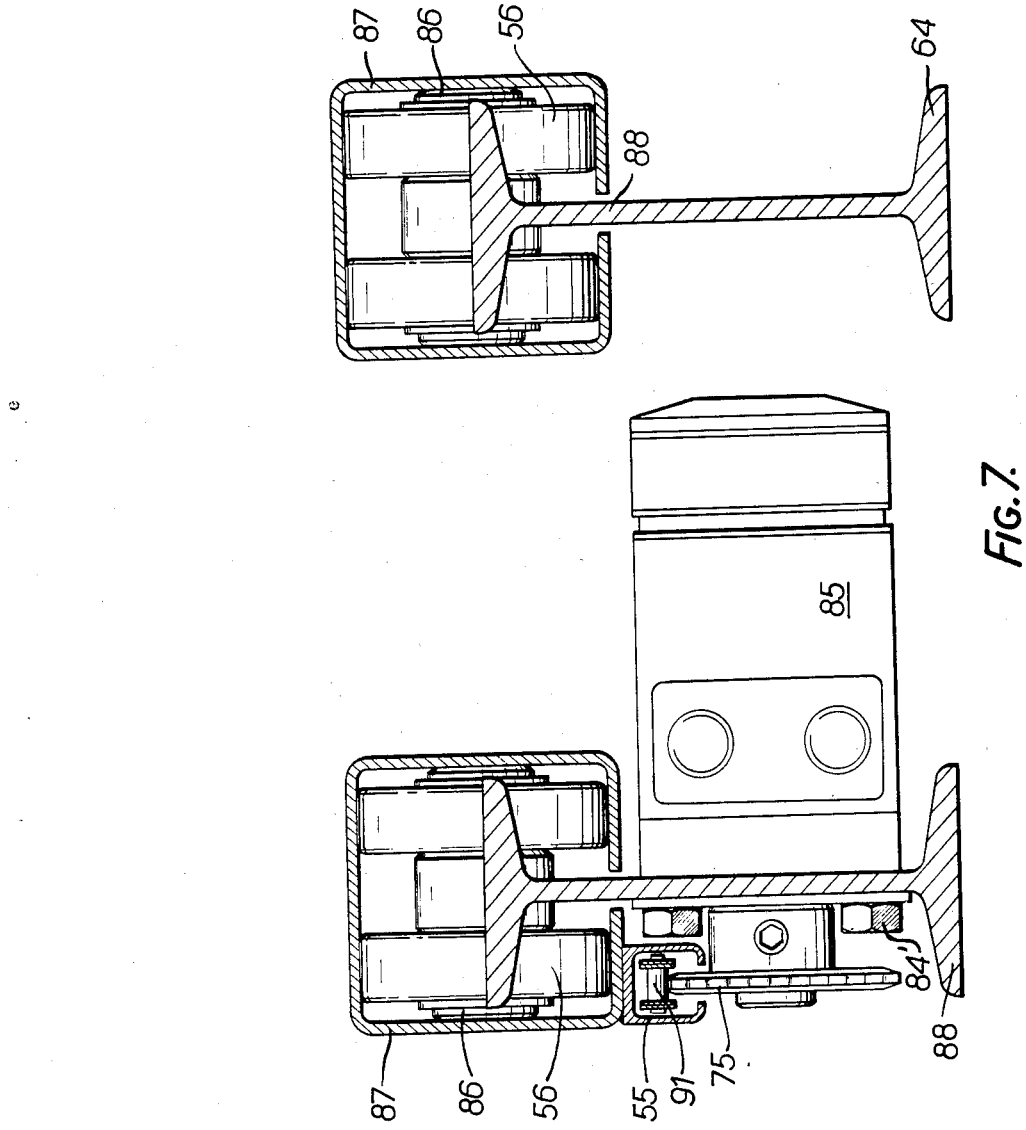

EXTENDIBLE BOOM INCLUDING A RACK AND PINION MECHANISM

TECHNICAL FIELD OF THE INVENTION

THIS INVENTION relates to an extendible boom, and more particularly to a boom which may be powered for extension and retraction in application on tractors and other like work vehicles to enable operations such as spraying, mowing etc.

BACKGROUND ART

A wide variety of equipment has been developed by which sprays, mowers, etc., may be operated off transport vehicles, such as tractors and other like vehicles, in order to cover extensive areas. Sprays, etc., are commonly mounted off booms in order that tractors travelling along access routes may apply sprays to areas off the access route. Similarly mowers, slashers, etc., working off roadways, utilise booms in order to reach roadside verges and cut down unwanted vegetation. These operations require deployment of boom type structures and fixed booms are of little use. Booms are known which may be swung out of the way. Hydraulically extendible booms similar to those used in crane construction have been used. However, no ready and simple solution has yet been found in the quest for an economical and easily maintained boom, for application off tractors and other like vehicles, to enable operations such as spraying, mowing etc.

OUTLINE OF THE INVENTION

It is an object of the present invention to provide an extendible boom which lends itself to motorised operation for the carrying of work heads during operation off mobile carriers therefor. It is a further object of the present invention to provide an extendible boom which comprises a simple construction, and an efficient and reliable mode of operation. It is a still further object of the present invention to provide an extendible boom which may be presented as a light weight construction. Another object of the present invention is an extendible boom which may be retractively extended using a simply realised rack and pinion style assembly. An additional object of the present invention is a boom which is cheap to manufacture requiring low labour input to its construction. Other objects and advantages will hereinafter become apparent.

The present invention achieves its objects by provision of an extendible boom for the operation of work heads supported thereon off supporting vehicles therefor comprising a boom assembly having an elongated work head carrying arm mounted on a supporting means therefor which enables reciprocating movement of said elongated arm in a direction extending along the length thereof, and a source of motive power for application to said elongated work head carrying arm to move said arm back and forth characterised in that a rack and pinion mechanism is employed for coupling said source of motive power to said arm wherein said rack extends along the length of said arm and said pinion is connected to said source of motive power, said arm comprises a hollow channel section having a lengthwise extending slot through a wall thereof through which a plate-like supporting member of said supporting means is passed having bearing mounting means within said channel, bearing assemblies mounted to said mounting means and engaging with inner surfaces of said hollow channel section to locate and guide said channel for lengthwise movement on said bearing assemblies.

BRIEF DESCRIPTION OF DRAWINGS

In order that the invention may be more readily understood and put into practical effect, reference will now be made to the accompanying drawings which illustrate a preferred embodiment thereof and wherein:

FIG. 1 shows schematically the features of an extendible boom according to the present invention;

FIG. 2 is a section through the boom of FIG. 1;

FIG. 7 is a sectional view through the boom of the mechanism of FIGS. 5 and 6.

METHOD OF PERFORMANCE

Figure 3:
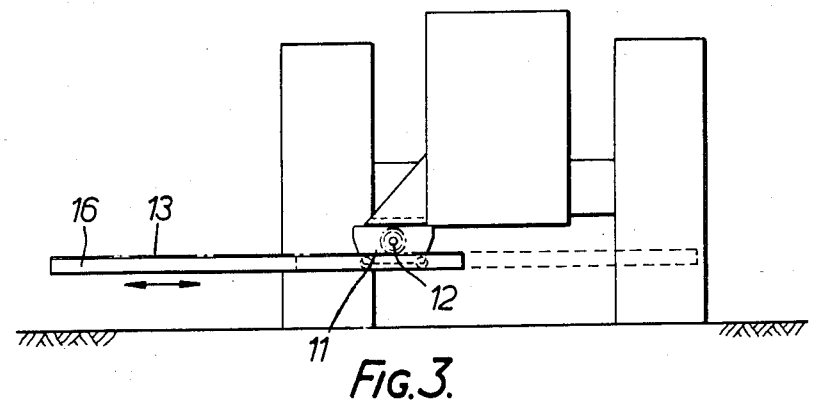
FIG. 3 shows an extendible boom according to the present invention mounted to a tractor.

In FIG. 1, item 11 is a boom carrier bracket in form of a plate-like member by which the boom assembly may be mounted to a tractor or other like vehicle. Supported on the boom carrier bracket 11, on a shaft passing therethrough, is a pinion 12 which may be a chain type sprocket. The pinion 12 engages with a rack 13 which is a roller chain when a chain sprocket pinion is employed. Also supported on the boom carrier bracket 11 are boom support means 17 which may be freely rotatable wheels on roller bearings on axles 18. The boom 16 may be a unitary integral box-shaped hollow length of channelling (as seen in FIGS. 2 and 3) in which the boom support means 17 is located to support the channel section thereupon. The boom 16 and support means 17 is more clearly seen in FIG. 2 and as seen in this figure the length of axles 18 is shorter than the distance between the side walls of the hollow length of channelling 16. Where a roller chain is employed as the rack 13, it may be supported upon the boom and connected at its ends so as to be held in place by suitable connectors 20 which may be through bolts which also serve to prevent the boom support means 17 from running out of the boom at the ends thereof. The connector 20 may provide an end stop means for the boom's travel.

FIG. 2 is a view of the boom assembly as shown in FIG. 1, from another angle, being the section indicated in FIG. 1 with like integers similarly numbered. The pinion 12 is shown mounted on the output shaft of a suitable source of motive power 14 which may be an hydraulic motor. Also employed in relation to the pinion 12 as an optional feature is a torque limiter assembly 15 as is further described below. Boom carrier bracket 11 supports at its lower extremities, the boom support means 17 on axles 18 retained thereto by a retaining clip 19. The boom 16 encompasses the boom support means to be supported thereby.

FIG. 3 shows one possible application of the boom as a rear mounted extendible arm by which a work head may be supported off to the side of a tractor 21 or other like support vehicle. Boom bracket 11 is supported off the back of the tractor and rack 13, and pinion 12, enable movement of the boom 16 from a retracted position shown dotted, behind the tractor 21, and an extended position projected out to the side of the tractor.

Figure 4:
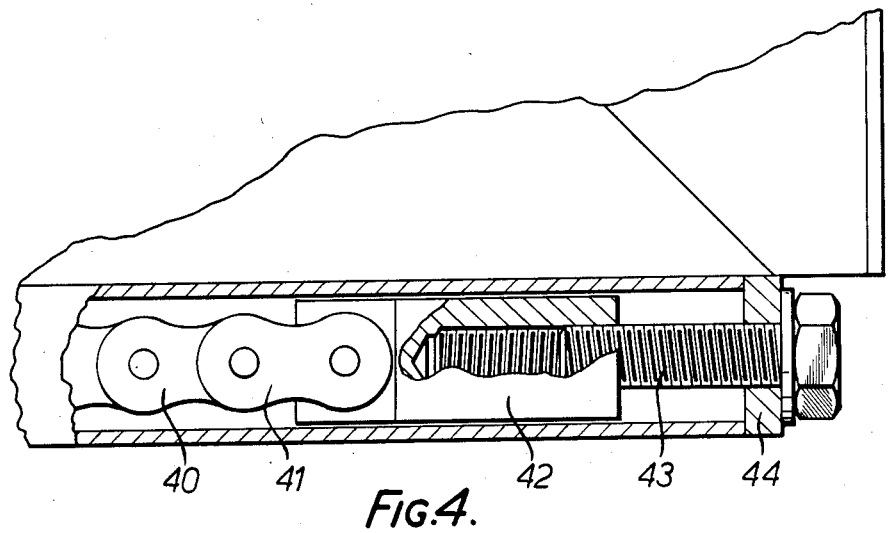
FIG. 4 illustrates a mechanism for properly tensioning the chain employed in a boom according to the present invention.

In FIG. 4, roller chain 40 terminates in a slide means 42 with end link 41 pivotally attached thereto preferably by a pin through the link and slide means. The slide means 42 need only be threadably engaged with a bolt means 43 by which the slide means 42 may be drawn endwise to pull the chain taut. To enable this the head of bolt means 43 acts against the end of a chain case means 44 attached beneath the boom arm. Chain tension is readily adjustable at any time by use of this mechanism.

Figure 5:
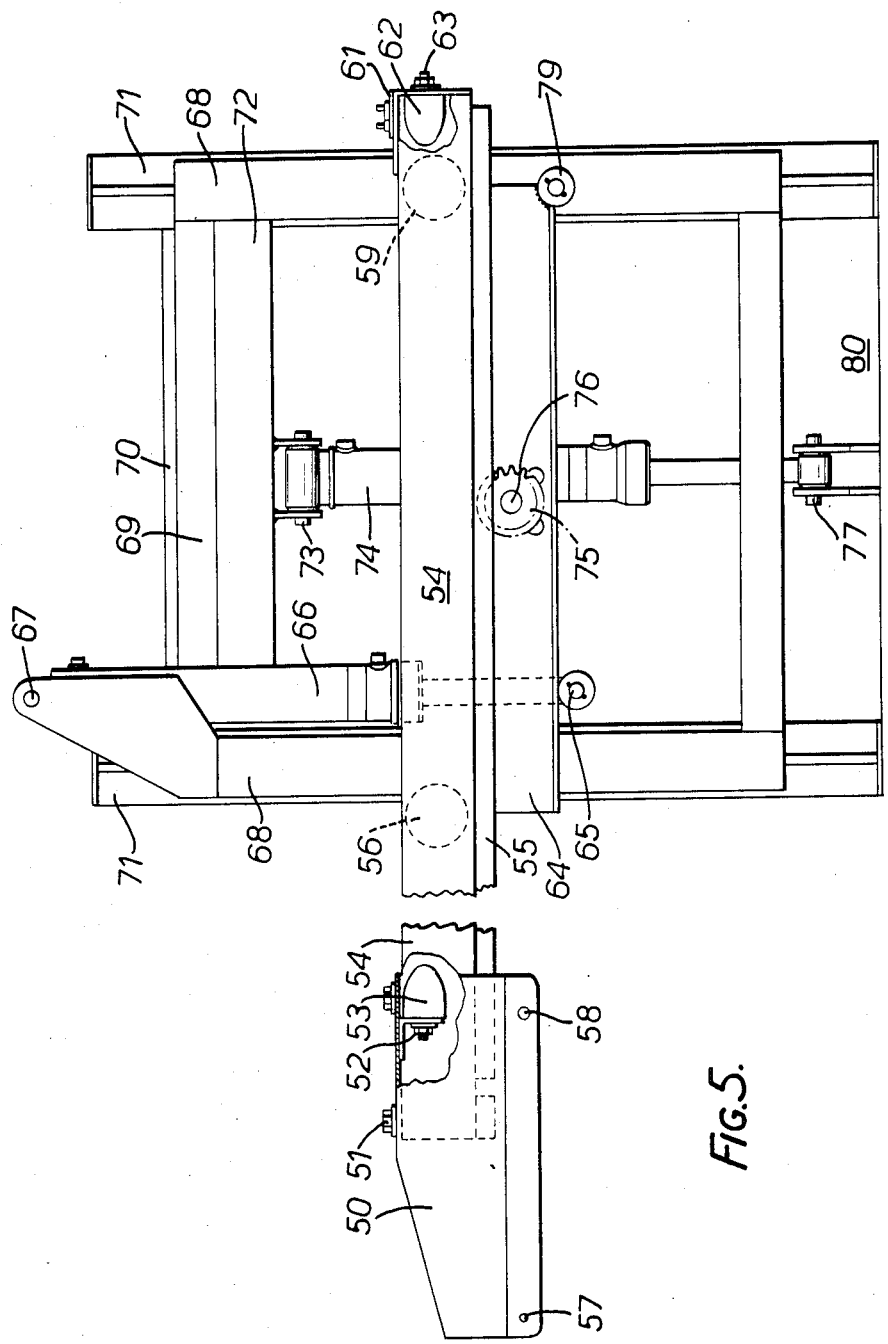
FIG. 5 illustrates a front view of a mechanism for mounting a boom according to the present invention off a tractor.

In FIG. 5, boom 54 is pivotally mounted on a carrier 64 pivotally supported at 79 to be raised and lowered by a ram 66 connected between boom 54 at point 65 and vertically movable frame 72 at point 67 provided on an extension of the slidably mounted vertical side member 68 of frame 72. The has vertical side members 68 run on slide means 71 to raise and lower the boom and frame as an assembly. To facilitate this a ram 74 is connected between frame 72 at point 73 and a cross piece 80 fixed to slide means 71 at point 77. Operation of the two rams enables the raising and lowering of the boom and its tilting upwardly off the horizontal.

In FIG. 5, boom 54 is fitted with a tool mounting head 50 provided with connector points 57 and 58 for mounting work heads thereto. Mounting head 50 is bolted to boom 54 at 51 and end stops are internally provided with resilient pads 53 and 62 mounted to a suitable bracket by connector 52 and 63. Boom 54 runs on internal rollers indicated at 56 and 59. Rollers 56 and 59 may be mounted to carrier 64 with boom 54 riding thereover under action of sprocket wheel 75 turned on axis 76 to engage with a roller chain in cover 55.

Figure 6:
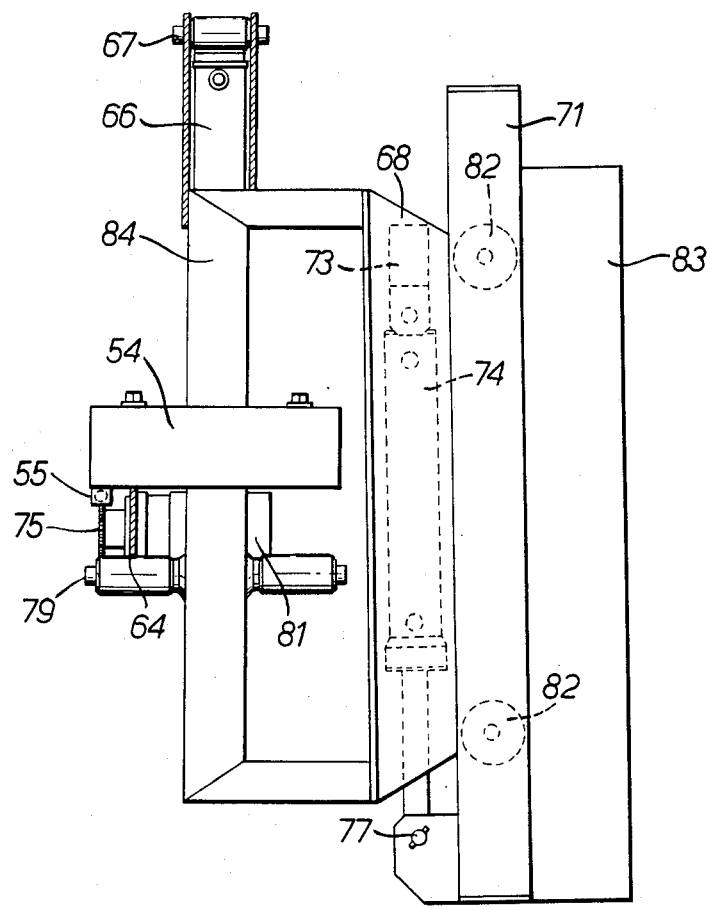
FIG. 6 is a side view of the mechanism of FIG. 5.

FIG. 6 is a side view of FIG. 5 with like parts similarly numbered. Frame 72 runs vertically on slide means 71 on rollers 82 within a hollow channel section similar to the concept employed in the boom. Slide means 71 are carried by a support 83 which may include suitable couplings for connection to standard links on a variety of tractors. The boom 54 comprises two parallel hollow sections as described with respect to FIG. 7. The two boom sections pass before and behind frame members 84 connected to side members 68 (see FIG. 6).

In FIG. 7 is seen a sectional view through the boom of FIGS. 5 and 6 showing two spaced parallel boom channel members 87 with boom support members 88 slotted therein and having rollers 56 to locate the boom vertically. To locate it horizontally bearing surfaces 86 may be provided, or alternatively a second set of rollers on a vertical axis might be employed to locate the boom horizontally. Motor 85 may be bolted such as at 84' to support member 88 to drive sprocket 75 engaged with roller chain 91 contained in cover channel 55. Placing the chain beneath the boom in cover 55 prevents the build up of dirt within the chain links as may occur when the chain is laid on top of the boom. The cover lips provide support for the chain.

The above described assembly enables a motorised extension and retraction system operable off a hydraulic power take off point, or other suitable type of take off point, of a tractor or other like vehicle. Such an assembly may be used as an orchard boom spray, for roadside or parkland grass mowing, and many more diverse applications. The fitting of the attachments for spraying, grass mowing, etc., will be obvious to persons skilled in the art and these are not described here. A complete unit comprises a bracket, wheels, hydraulic motor, torque limiting coupling, chain sprocket and roller chain. The integers of the assembly are all readily available items and their construction into the boom of the present invention is quickly and cheaply achieved. The boom is a slotted steel boom which may simply be a rolled steel section. The hydraulic motor may be a conventional type and may be operated at varying speeds in either the forward or reverse direction. The torque limiter may be a friction clutch type of torque limiting coupling to protect the rack and pinion against overloading whenever the travel limit is reached, or jamming occurs.

Engagement of the chain and sprocket is assured by restraining the vertical and sideways movement of the boom which may be controlled by the limited clearance between the diameter of the wheels and the internal height of the boom, and also the limited clearance between the edges of the slot and the bracket passing therethrough. Additionally where a rolled section is used, or an extrusion having rounded internal corners, the radiused corners act on the wheels to centre them therebetween.

The selection of wheel diameter, boom, and axle length are crucial to maintaining positive engagement of the rack and pinion.

The above described assembly employs commercially available parts ensuring inexpensive manufacture through low labour content. The assembly is significantly faster in operation than equivalent hydraulic booms, and travel distances are limited only by boom length.

While the above has been given by way of illustrative example, many modifications and variations as would be apparent to persons skilled in the art may be made thereto without departing from the broad scope and ambit of the invention as herein set forth and defined in the appended claims.

I claim:

1. An extendible boom comprising an elongated work head carrying arm mounted on a supporting means therefor which enables reciprocating movement of said elongated arm in a generally horizontal direction along the length thereof, a source of motive power for application to said elongated work head carrying arm to move said elongated arm back and forth, a rack and pinion mechanism for coupling said source of motive power to said elongated arm wherein said rack extends along the length of said elongated arm and said pinion is connected to said source of motive power, said elongated arm being a hollow channel section which is rectangular in cross section and is closed on all its sides but the lower having a lengthwise extending slot through the lower side thereof, said supporting means having a plate-like member passed through said slot for supporting a bearing assembly comprising two roller pairs disposed on axles supported by the plate-like member, said roller pairs engaging with inner surfaces of the upper and lower sides of said hollow channel section to locate and guide said channel for lengthwise movement on said roller pairs, said rack being disposed along the underside of the elongated arm and said pinion and source of motive power being mounted to said plate-like member beneath said elongated arm, said rack being fixed at each end to opposite ends of said elongated arm, a resilient bumper means being provided at each rack end to engage with an end stop at the extent of each of the extending and retracting movements, one of said rack ends being interconnected with a rack tension adjusting mechanism comprising a tapped, sliding block attached to said rack end, a housing to prevent twisting of said sliding block and a screw bolt which engages said tapped block whereby the rack tension is adjusted.

2. An extendible boom as claimed in claim 1, wherein said supporting means comprises a frame means supporting said elongated work head carrying arm having vertically extending side arms adapted for reciprocating movement along their lengths, each being reciprocatively movable along the length of two vertically extending guide means and a source of motive power operable to move said frame means up and down said guide means.

3. An extendible boom as claimed in claim 2, wherein said supporting means is pivotally connected to said frame means so as to enable said arm to be tilted up and down in a vertical plane about a pivoting connection, said pivotal connection being disposed to one side of said frame and said support means and arm therein extending across the width of said frame and a source of motive power being connected between said frame and said supporting means to pivot the supporting means about its pivotal connection.

4. An extendible boom comprising an elongated work head carrying arm mounted on a supporting means therefor which enables reciprocating movement of said elongated arm in a generally horizontal direction along the length thereof, a source of motive power for application to said elongated work head carrying arm to move said elongated arm back and forth, a rack and pinion mechanism for coupling said source of motive power to said elongated arm wherein said rack extends along the length of said elongated arm and said pinion is connected to said source of motive power, said elongated arm being a hollow channel section which is rectangular in cross section and is closed on all its sides but the lower having a lengthwise extending slot through the lower side thereof, said supporting means having a plate-like member passed through said slot for supporting a bearing comprising two roller pairs disposed on axles supported by the plate like member, said roller pairs engaging with inner surfaces of the upper and lower sides of said hollow channel section to locate and guide said channel for lengthwise movement on said roller pairs, said rack being disposed along the underside of the elongated arm and said pinion and source of motive power being mounted to said plate-like member beneath said elongated arm, said elongated work head carrying arm comprising two parallel elongated channel sections structurally interconnected at the ends thereof to provide a unitary rigid arm, each said channel section receiving therein and guiding spaced apart supporting bearing assemblies to located said channel sections for reciprocating movement thereover, said arm being pivotally connected to said support means at a vertical member thereof which member passes between said channels with the axis of said pivot being transverse to said pair of channel and said member.

5. An extendible boom as claimed in claim 4, wherein said bearing assemblies comprise rollers on common axes disposed one on each side of said channel opening rolling between the inner faces of the upper and lower channel walls, said channels being guided in the horizontal plane for movement along the length of the arm by bearing surfaces slidably engaging against the inner faces of the channel side walls.

6. An extendible boom comprising an elongated work head carrying arm mounted on a supporting means therefor which enables reciprocating movement of said elongated arm in a generally horizontal direction along the length thereof, a source of motive power for application to said elongated work head carrying arm to move said elongated arm back and forth, a rack and pinion mechanism for coupling said source of motive power to said elongated arm wherein said rack extends along the length of said elongated arm and said pinion is connected to said source of motive power, said elongated arm being a hollow channel section which is rectangular in cross section and is closed on all its sides but the lower having a lengthwise extending slot through the lower side thereof, said supporting means having a plate-like member passed through said slot for supporting a bearing comprising two roller pairs disposed on axles supported by the plate like member, said roller pairs engaging with inner surfaces of the upper and lower sides of said hollow channel section to locate and guide said channel for lengthwise movement on said roller pairs, said rack being disposed along the underside of the elonagated arm and said pinion and source of motive power being mounted to said plate-like member beneath said elongated arm, said supporting means comprising a frame means supporting the elongated work head carrying arm having vertically extending side arms adapted for reciprocating movement along their lengths, each being reciprocatively movable along the length of two vertically extending guide means and a source of motive power operable to move said frame means up and down said guide means, said elongated work head carrying arm comprising two parallel elongated channel sections structurally interconnected at the ends thereof to provide a unitary rigid arm, each channel section receiving therein and guiding spaced apart supporting bearing assemblies to locate said channel sections for reciprocating movement thereover, said arm being pivotally connected to said frame means at a vertical member thereof which member passes between said channels with the axis of said pivot being transverse to said pair of channels and said member.

7. An extendible boom for mounting to a vehicle and comprising a combined mounting and supporting means adapted for mounting the boom to the vehicle and for supporting an elongated work head carring arm for reciprocating movement in a generally horizontal direction along the length thereof, a source of motive power for thus moving said elongated arm by way of a rack and pinion mechanism, said pinion being connected to said source of motive power for drive thereby and said rack being fixed to and extending along the length of said elongated arm for engagement with said pinion for drive thereby, said elongated arm comprising a unitary integral box-shaped hollow roll formed channel section of rectangular cross section, defined by top, bottom and two side walls extending the full length of the channel section, closed on all sides except for the bottom wall which is formed with a lengthwise extending slot, said combined mounting and supporting means being constituted of a plate-like member which at a first portion thereof is adapted to mount the boom to the vehicle and having another portion passing through the slot and supporting wholly within the inner confines of said reciprocating channel section, between the side walls thereof, a bearing means comprising two roller pairs which in turn support said channel section during its reciprocating movement, said roller pairs engaging said inner surfaces of the top and bottom walls of said hollow section to also locate and guide said channel for reciprocating movement on said roller pairs, said rack being fixed to and extending solely along the exterior side of the bottom wall of the channel for coaction with said pinion.

8. The boom of claim 7, wherein said two roller pairs are mounted at opposite ends of axles disposed within said channel substantially perpendicularly to the side walls of said channel, said another portion of said plate-like member being connected to said axles substantially intermediate the length thereof.

9. The boom of claim 8, wherein said axles have a length which is shorter than the distance between the side walls of said channel section.

* * * * *